United States Patent
Alhammad et al.

(10) Patent No.: US 12,460,943 B2
(45) Date of Patent: Nov. 4, 2025

(54) AIR POLUTANTS EXCEEDENCE MONITORING AND ALERTING SYSTEM WHICH INTEGRATES POLLUTANT AND GEOLOCATION DATA

(71) Applicant: SAUDI ARABIAN OIL COMPANY, Dhahran (SA)

(72) Inventors: Faisal Yousef Alhammad, Dammam (SA); Mostafa Abdel-Aziz Abou-Ghanem, Dhahran (SA); Hussain M. Alnasser, Safwa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 309 days.

(21) Appl. No.: 18/046,434

(22) Filed: Oct. 13, 2022

(65) Prior Publication Data
US 2024/0125621 A1    Apr. 18, 2024

(51) Int. Cl.
| | | |
|---|---|---|
| G01C 21/00 | (2006.01) | |
| G01C 21/34 | (2006.01) | |
| G01N 1/22 | (2006.01) | |
| G01N 33/00 | (2006.01) | |
| G06F 16/29 | (2019.01) | |
| H04W 4/38 | (2018.01) | |

(Continued)

(52) U.S. Cl.
CPC ..... *G01C 21/3874* (2020.08); *G01C 21/3461* (2013.01); *G01C 21/3469* (2013.01);
(Continued)

(58) Field of Classification Search
CPC ........... G01N 1/2273; G01N 2001/021; G01N 33/0004; G01N 33/004; G01N 33/0075;
(Continued)

(56) References Cited

U.S. PATENT DOCUMENTS

| | | |
|---|---|---|
| 9,332,322 B2 | 5/2016 | Niemeyer et al. |
| 10,883,974 B2 | 1/2021 | Mou et al. |

(Continued)

FOREIGN PATENT DOCUMENTS

| | | |
|---|---|---|
| CN | 104950076 B | 12/2016 |
| CN | 109444336 A | 3/2019 |

(Continued)

OTHER PUBLICATIONS

Singh et al.; "Sensors and systems for air quality assessment monitoring and management: A review", Journal of Environmental Management; vol. 289; Apr. 4, 2021; pp. 1-18 (18 pages).

(Continued)

*Primary Examiner* — Timothy P Graves
(74) *Attorney, Agent, or Firm* — Osha Bergman Watanabe & Burton LLP

(57) ABSTRACT

A method and a system for tracking a concentration of pollution elements in air are disclosed. The system includes a plurality of air pollutant monitoring stations configured to obtain data from a plurality of air samples and an information logger that communicates with the plurality of the air pollutant monitoring stations and that is configured to collect and organize the data obtained from the plurality of the air pollutant monitoring stations in the real time or periodically. Further, a data storage is engaged with the information logger and stores the collected data into a relational database, creates triggers for instances when air pollution parameters exceed a given limit value, and triggers an alert. Additionally, a geographic information system analyzes the stored data, geo-locates the plurality of the air pollutant monitoring stations and the analyzed data, and generates reports based on the analysis of the stored data.

18 Claims, 5 Drawing Sheets

(51) Int. Cl.
  *G01N 1/02* (2006.01)
  *G08B 21/12* (2006.01)
(52) U.S. Cl.
  CPC ....... *G01C 21/3867* (2020.08); *G01N 1/2273* (2013.01); *G01N 33/0004* (2013.01); *G01N 33/0037* (2013.01); *G01N 33/004* (2013.01); *G01N 33/0042* (2013.01); *G01N 33/0075* (2013.01); *G06F 16/29* (2019.01); *G01N 2001/021* (2013.01); *G08B 21/12* (2013.01); *H04W 4/38* (2018.02); *Y02A 50/20* (2018.01); *Y02P 90/84* (2015.11); *Y02W 90/00* (2015.05)
(58) Field of Classification Search
  CPC ........... G01N 33/0037; G01N 33/0042; G01N 33/0039; G01N 33/0047; G01N 21/3504; G08B 21/12; Y02A 50/20; H04W 4/38; G06F 16/29; Y02P 90/84; Y02W 90/00; G01C 21/3874; G01C 21/3461; G01C 21/3469; G01C 21/3867
  See application file for complete search history.

(56) References Cited

U.S. PATENT DOCUMENTS

| | | |
|---|---|---|
| 10,890,350 B2 | 1/2021 | Martin |
| 2009/0273470 A1 | 11/2009 | Sinkevicius et al. |
| 2013/0144527 A1* | 6/2013 | Kuhnreichi ............ G01N 33/00 702/2 |
| 2016/0370339 A1 | 12/2016 | Liu et al. |
| 2021/0096119 A1 | 4/2021 | Qu et al. |
| 2024/0004864 A1* | 1/2024 | Gao .................... G06F 16/9027 |

FOREIGN PATENT DOCUMENTS

| | | | |
|---|---|---|---|
| CN | 109946418 A | 6/2019 | |
| CN | 111121862 A | 5/2020 | |
| CN | 112782366 A | 5/2021 | |
| CN | 113554052 A | 10/2021 | |
| FR | 3086384 A1 * | 3/2020 | |
| WO | WO-2017068499 A1 * | 4/2017 | ............. G01N 33/00 |
| WO | 2022015937 A1 | 1/2022 | |
| WO | WO-2022008500 A1 * | 1/2022 | ............. F24F 13/28 |

OTHER PUBLICATIONS

J. Gulliver and D. Briggs; "STEMS-Air: A simple GIS-based air pollution dispersion model for city-wide exposure assessment", Science of the Total Enviroment; vol. 409; Mar. 31, 2011; pp. 1-11 (11 pages).

Office Action issued in corresponding Saudi Arabian Application No. 123450558; dated Apr. 15, 2025 (16 pages).

* cited by examiner

Attribute Search

O3 8-Hour Violations

| STNCODE | STATIONNAME | VIOLATIONS | READING_CYCLE |
|---|---|---|---|
| 1 | RIYADH | 171 | 30/APR/2019 - 07/MAY/2019 |
| 1 | RIYADH | 189 | 08/MAY/2019 - 15/MAY/2019 |
| 1 | RIYADH | 189 | 16/MAY/2019 - 23/MAY/2019 |
| 1 | RIYADH | 188 | 24/MAY/2019 - 31/MAY/2019 |
| 2 | RAHIMAH | 169 | 30/APR/2019 - 07/MAY/2019 |
| 2 | RAHIMAH | 190 | 08/MAY/2019 - 15/MAY/2019 |
| 2 | RAHIMAH | 188 | 16/MAY/2019 - 23/MAY/2019 |
| 2 | RAHIMAH | 190 | 24/MAY/2019 - 31/MAY/2019 |
| 4 | ABQAIA | 171 | 30/APR/2019 - 07/MAY/2019 |
| 4 | ABQAIA | 187 | 08/MAY/2019 - 15/MAY/2019 |
| 4 | ABQAIA | 169 | 16/MAY/2019 - 23/MAY/2019 |
| 4 | ABQAIA | 190 | 24/MAY/2019 - 31/MAY/2019 |
| 8 | SHEDGUM | 173 | 30/APR/2019 - 07/MAY/2019 |
| 8 | SHEDGUM | 190 | 08/MAY/2019 - 15/MAY/2019 |
| 8 | SHEDGUM | 190 | 16/MAY/2019 - 23/MAY/2019 |

140 records

Search pattern

FIG. 2

AIR POLUTANTS EXCEEDENCE MONITORING AND ALERTING SYSTEM WHICH INTEGRATES POLLUTANT AND GEOLOCATION DATA

BACKGROUND

The disclosure aims to tracks the concentration of pollution elements in the air resulting from the industrial activities of hydrocarbon products as a map centric platform. Specifically, the air pollution relates to releasing particulates, biological molecules, or other harmful materials into Earth's atmosphere, causing damage to the living organisms such as humans, animals, plants, or the natural or built environment. The air pollution may come from the human activities as well as the natural sources. Some of the main human caused sources include traffic, coal-burning, industry production, and dust emission.

This disclosure uses real-time and historical meteorological data for compliance with international standards and raises warning when concentration of an air pollutant element such NoX or $CO_2$ exceeds allowable levels. The system is integrated with geospatial data analysis services to geographically locate the exceedance source, identify impacted area based on buffer distance using Geographic Information System (GIS) analysis tools and then alert the stakeholders. This system extends the existing technology of Air Quality monitoring systems by integrating with GIS based geo-location and analysis tool to share and report air pollutants exceedance information for analysis and proactive for the health and safety. This system also enables generation of weather data graphs, wind rose for compliance review and reporting.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system for tracking a concentration of pollution elements in air. The system includes a plurality of air pollutant monitoring stations configured to obtain data from a plurality of air samples in real time or periodically and an information logger that communicates with the plurality of the air pollutant monitoring stations and that is configured to collect and organize the data obtained from the plurality of the air pollutant monitoring stations in the real time or periodically. Further, a data storage is engaged with the information logger and stores the collected data into a relational database, creates triggers for instances when air pollution parameters exceed a given limit value, and triggers an alert. Additionally, a geographic information system (GIS) analyzes the stored data, geo-locates the plurality of the air pollutant monitoring stations and the analyzed data, and generates reports based on the analysis of the stored data.

In general, in one aspect, embodiments disclosed herein relate to a method for tracking a concentration of pollution elements in air. The method includes obtaining data from a plurality of air samples in real time or periodically using a plurality of air pollutant monitoring station and collecting and organizing the data obtained from the plurality of the air pollutant monitoring stations in the real time or periodically using the information logger. Further, the method includes storing the collected data into a relational database, creating triggers for instances when air pollution parameters exceed a given limit value, and triggering an alert and analyzing the stored data, geo-locating the plurality of the air pollutant monitoring stations and the analyzed data, and generating reports based on the analysis of the stored data.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

FIG. 2 shows workflow in accordance with one or more embodiments.

DETAILED DESCRIPTION

Figure 1:
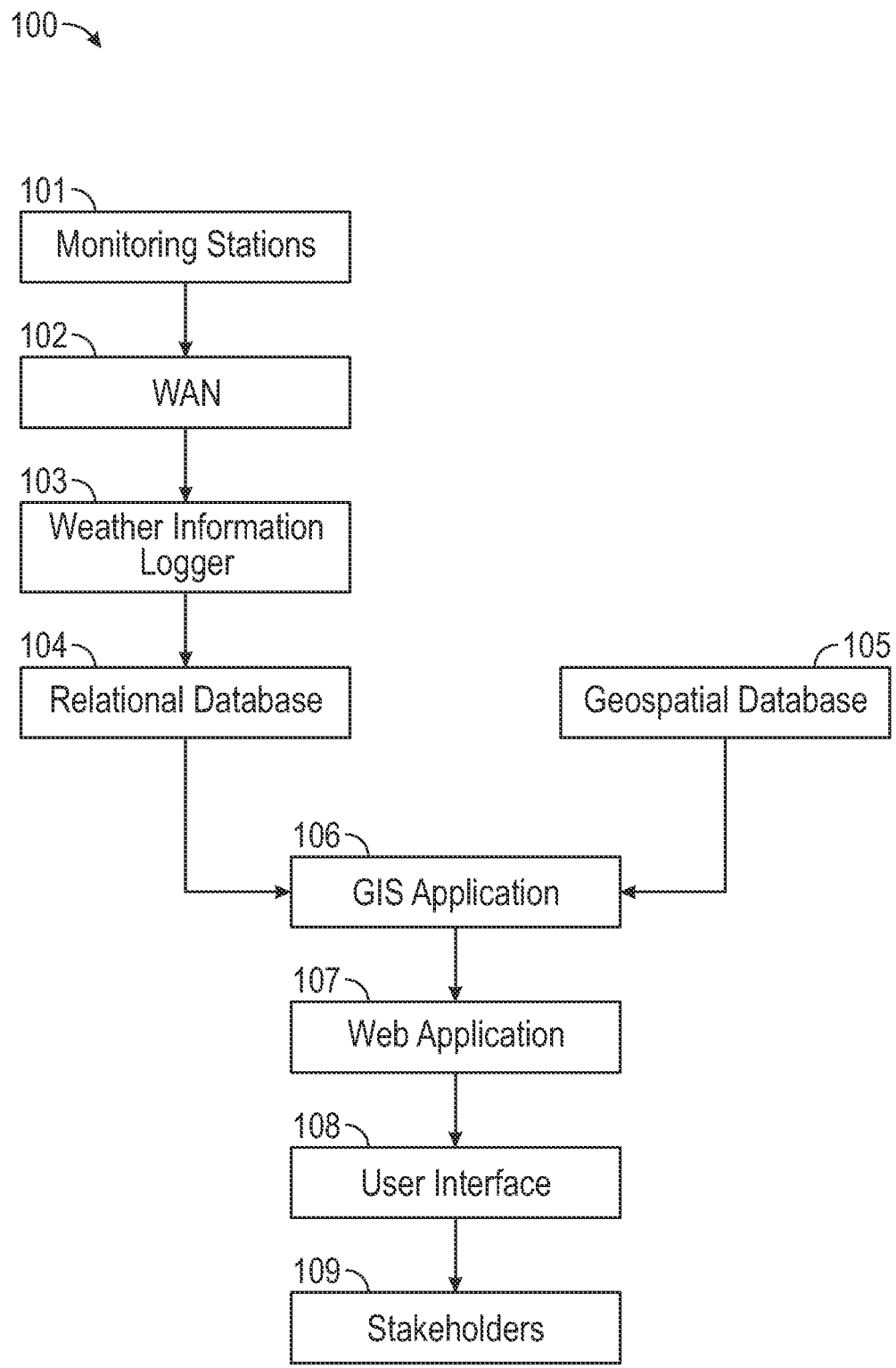
FIG. 1 shows a system in accordance with one or more embodiments.

In the following detailed description of embodiments disclosed herein, numerous specific details are set forth in order to provide a more thorough understanding disclosed herein. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and a system for monitoring the exceedance of the pollutants and alerting the stakeholders. More specifically, embodiments disclosed herein are directed to a map centric platform to track the concentration of pollution elements in the air resulting from the industrial activities of hydrocarbon products. The system objective is to track real-time and historical meteorological data for compliance with international standards and raise warning when concentration of an air pollutant element such NoX or $CO_2$ exceeds allowable levels. The system is integrated with geospatial data analysis services to geographically locate the exceedance source, identify impacted area based on buffer distance using Geographic Information System (GIS) analysis tools and then identify/alert the stakeholders. This system extends the existing technology of Air Quality monitoring systems by integrating with GIS based geo-location and analysis tool to share and report air pollutants exceedance information for analysis and pro-active for the health and safety. This system also enables generation of weather data graphs, wind rose for compliance review and reporting. The benefits of this map centric system are providing the geospatial analysis alongside the geospatial view, as well as the flexibility to extend to cover new operation areas and weather station and possibility to extend to deploy on mobile devices. Additionally, the generated maps of the larger areas, may be used to predict and precisely locate the potential air pollution catastrophe sites and construct systems to prevent the catastrophes and upcoming hazards. This system may be used to monitor the key performance indicators of plants and refineries to ensure their compliance with international environmental protection standards. The spatial data of this system may be utilized in the corporate emergency response geospatial system to display wind rose and wind directions to identify evacuation paths and gathering areas during emergencies of fatal gas leakage at hydrocarbon processing plants.

Turning to FIG. 1, in one or more embodiments, the pollutant exceedance monitoring and alerting system (100) monitors a large number of monitoring stations (101) in real time or periodically and analyses and transmits data to the centralized information logger system (103). The gathered data is stored in the relational databases (104) triggering the procedures to restructure the data. The restructured data is analyzed and compared to benchmarks to ensure the compliance with the allowed limits. The allowed limits may be determined through the user interface (108) or based on GIS (106) predictions. The pollutant exceedance monitoring and alerting system (100) continues to monitor the data and alerts the stakeholders if the pollution exceeds the allowed limits.

As shown in FIG. 1, in one or more embodiments, the process of monitoring the air pollution starts with a plurality of the monitoring stations (101). The monitoring stations (101) may be installed to a variety of facilities, such as, at least, weather stations, weather ships, weather buoys. Although not shown, the monitoring stations (101) may include a processor, firmware, and logistical instructions/software to perform the aforementioned functions. The monitoring stations (101) operate by using the suction mechanisms to obtain air samples periodically. The air samples may be tested using physical or chemical means.

The physical mechanism of testing the air sample may be by illuminating the air sample with a beam of light of a predefined wavelength and measuring the scattered light. Further, the air sample may be physically tested using, at least, the ultraviolet spectroscopy, measuring the impact force of the fine particles in the air sample or by measuring the absorbed energy emitted from an external source. Further, the chemical means of testing the air sample include, at least, chemiluminescence, pulsed fluorescent spectroscopy, or infrared spectroscopy. The measured chemical compounds may be, at least, Nitrogen Oxide ($NO_2$), Ozone ($O_3$), Carbon Monoxide (CO), Sulfur Oxide (SO), Sulfur Dioxide ($SO_2$), methane ($CH_4$), and different hydrocarbons.

Further, as shown in FIG. 1, the monitoring stations transmit the obtained air pollution data from remote operation areas to an information logger (103). In some embodiments, the monitoring stations (101) and the information logger (103) are interconnected via Wide Area Network (WAN) (102), which may include the Internet. Although FIG. 1 only shows one WAN (102) used to connect the monitoring stations (101) with the information logger (103), this is only done as a matter of convenience. It will be appreciated that WAN (102) may be used to connect a plurality of parts of the system.

The information logger (103) constantly collects the obtained air pollution data and organizes it in real time. The obtained data from multiple monitoring stations (101) is centralized with the information logger (103) as a single point of entry. The information logger (103) organizes the data based on received time. Further, the information logger (103) provides aggregation, filtering, searching, and monitoring of the obtained data. Although not shown, the information logger (103) may include a processor, firmware, and logistical instructions/software to perform the aforementioned functions. The memory of the information logger (103) may be any type of suitable memory, such as persistent storage, RAM, etc. The information logger (103) prepares the obtained data to be stored in the relational database (104).

The relational database (104) stores all data that has been obtained in a given period. Specifically, the relational database (104) is a type of database that stores and provides access to data points that are related to one another. Data is organized in rows according to the entries and in columns according to different parameters. Each table in the database has a unique identifier for each row. Additionally, triggers are determined for each parameter. The trigger is a stored procedure in the relational database (104) which automatically invokes whenever a special event in the database occurs. For example, a trigger may be invoked when any of the air pollution parameters exceeds the given limit value. Additionally, the trigger may be invoked when multiple parameters reach different values in given ranges. The effect of the trigger may be raising a warning or an alert.

For example, the user interface (108) may prepare the alerting or informing messages to the external entities such as the authorities, researchers, facilities etc. The alerts may be created for a human usage and they may be directed to individuals or teams that are associated with each external entity. Additionally or alternatively, alerts may be created for the systems at the external entities and they may be organized for internal or external systems. The alerting messages may be sent to the system admins or the users of the pollutant exceedance monitoring and alerting system (100) itself. An alert may be, for example, a visual alert, a haptic alert, an audio alert, or any other suitable type of alert.

As shown in FIG. 1, the system includes a geospatial database (105). In one or more embodiments, the location of air monitoring stations is geo-referenced into the geospatial database (105). The geospatial database (105) is a special database optimized for storing and querying data that represents objects defined in a geometric space, such as vector data and raster data. The data stored in the geospatial database (105) includes various types such as maps, imagery, datasets, tools, and procedures that tie every event, feature, or entity to a location, and use this information for various applications. To easily understand location, data must be represented using standard parameters such as position in a coordinate system, place name, or street address. With data volume growing exponentially, a geospatial database (105) provides the best manageability and security to analyze large, complex, heterogeneous spatial data.

Based on the knowledge obtained from the geospatial database (105), a geographical information system (GIS) (106) edits and maintains the geospatial data. GIS applications include both hardware and software systems. The GIS (106) supports geospatial objects, which are organized in layers that can be overlaid both visually and logically. The GIS (106) connects data to a map, integrating geolocation data with different types of information, such as, at least, cartographic data, photographic data, digital data, and data in spreadsheets. The information about the landscape, such as the location of streams, different kinds of vegetation, and different kinds of soil, as well as the information about the sites of factories, farms, and schools, or storm drains, roads, and electric power lines may be included in the GIS (106). By integrating with GIS based geo-location and analysis tools, air pollutants exceedance information is shared and reported for analysis proactively for the health and safety of the living creatures.

In one or more embodiments, the GIS (106) helps users understand patterns, relationships, and geographic context. The benefits include improved communication and efficiency as well as better management and decision making. The GIS (106) allows different types of information, to be positioned in layers a single map, using the location as the key index variable to relate different data types. The GIS (106) uses multiple file formats, such as, at least, a raster and vector. Raster formats are grids of cells or pixels. The raster formats are useful for storing GIS (106) data that vary, such as elevation or satellite imagery. Vector formats are polygons that use nodes and lines. The vector formats are used for storing GIS (106) data with firm borders, such as area borders or streets.

In one or more embodiments, the output of GIS system (106) is provided to a web application (107) operating in a network. The network may be a public network such as Internet, or may be a private network such as a wide area network (WAN) built within an organization. Further, the web application (107) may include software code that controls the operation of other software or hardware. For example, the web application (107) may control GIS (106) to access and process data. The web application (107) may be accessible from inside or outside the monitoring and alerting system 100.

Further, web application (107) provides a plurality of data manipulation and analysis options. Specifically, web application (107) may monitor the change of the air pollution parameter trends and identify the air pollution problems. Further, the web application (107) may perform the forecasting based on the data from the relational database (104) and the historical data from the geospatial database (105). For exemplary purposes, a web application (107) generated single map may include sites that produce pollution, such as factories, and sites that are sensitive to pollution, such as wetlands and rivers. Such a map would help scientists, geologists, and environmentalists determine where water supplies are most at risk.

Specifically, FIG. 2 shows an example of data in the form of a table displaying the ozone violations in 8-hour periods. Specifically, the table shows a station code, which is a primary key in this table. Every station code is associated with the monitoring station name. Additionally, the table shows the number of violations for each monitoring station and the time period in which those violations were measured. Those skilled in the art will appreciate that the data of FIG. 2 may be shown in one or more of various types of data structures, such as an array, a list, etc.

Figure 3:
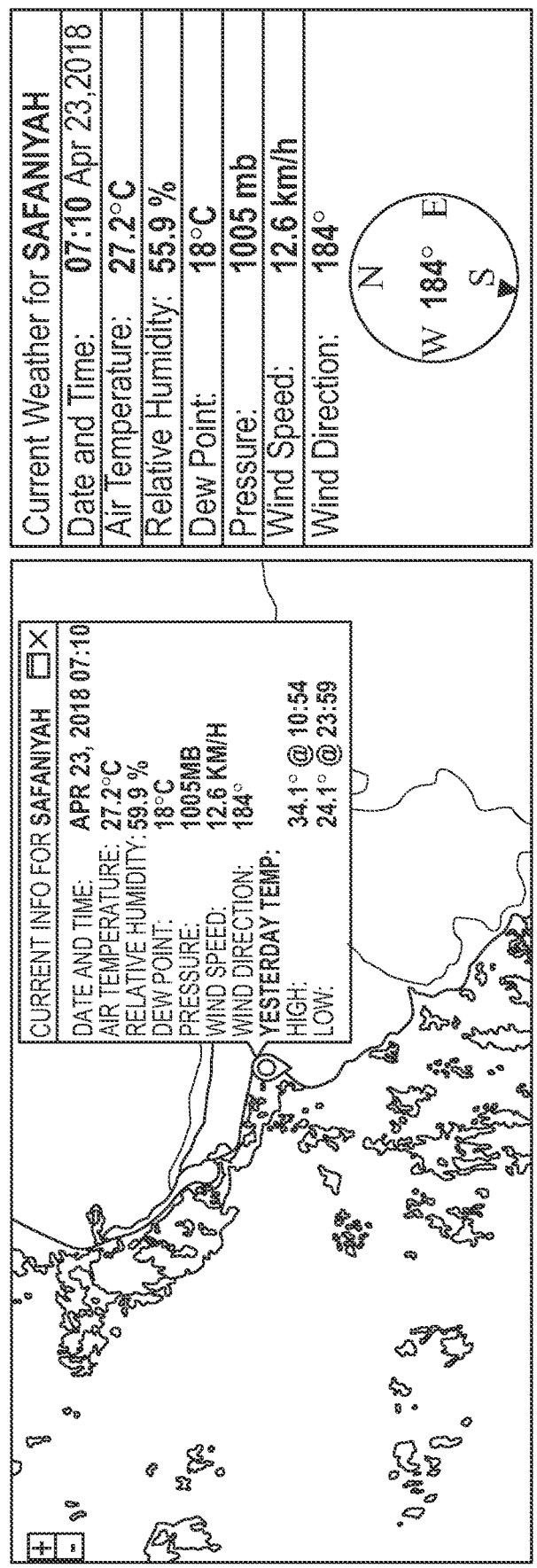
FIG. 3 shows a table displaying the ozone violations.

Further, FIG. 3. shows a map with the monitoring stations (101). The map is interactive and displays the meteorological information such as date and time, air temperature, relative humidity, dew point, pressure, wind speed and direction, etc. This data helps the GIS (106) to analyze the weather conditions and interpret the potential pollution emergency based on the analysis.

Figure 4:
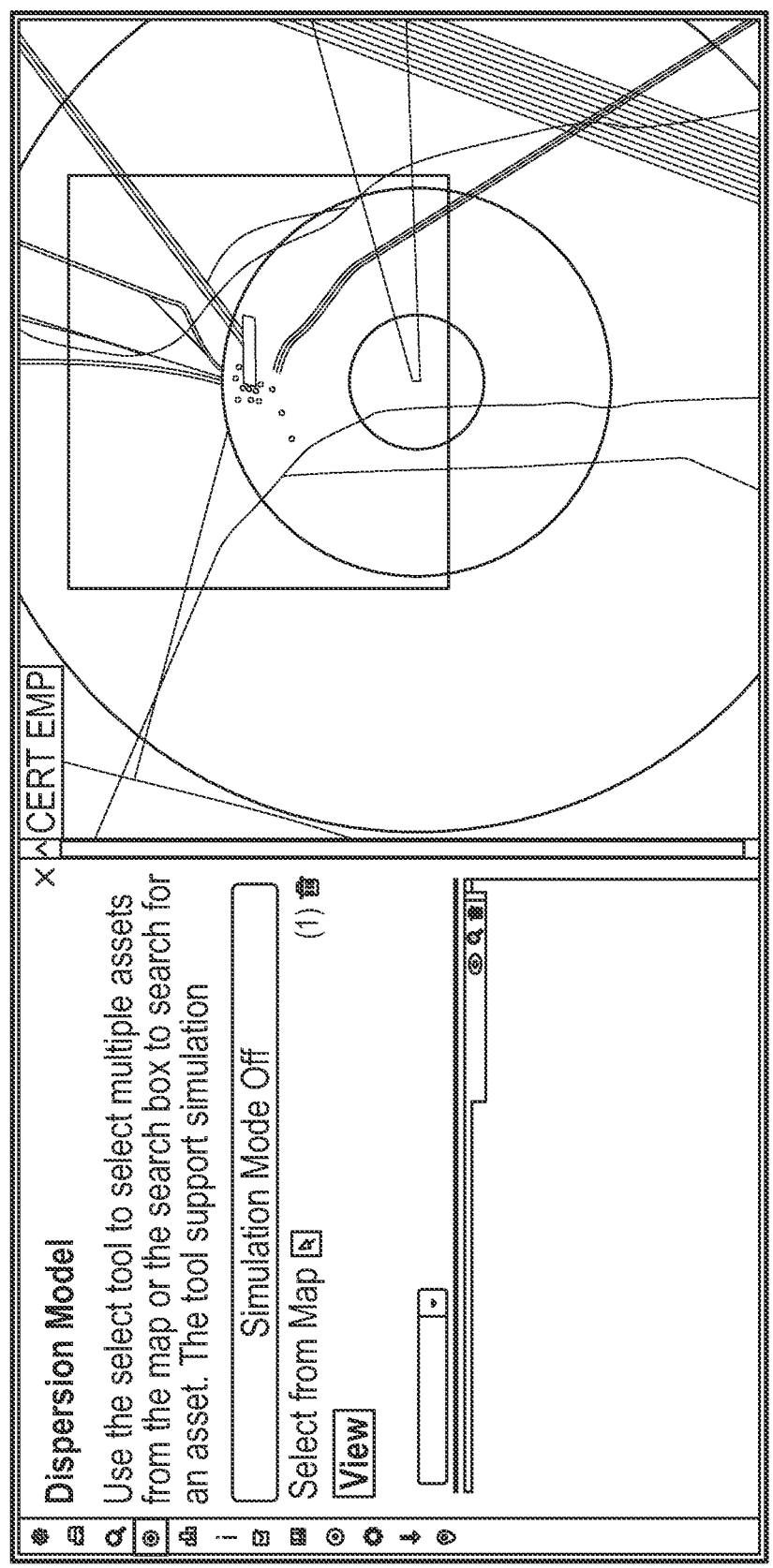
FIG. 4 shows a map with the monitoring stations.

FIG. 4 shows an example of case where the pollution emergency occurred. In this situation, the emergency was detected by the GIS (106) and the appropriate alerts were sent to the stakeholders (109). Additionally, the GIS (106) generated a map with buffer zones, indicating the pollution areas. The map shows three circles, where the inner circle represents the zone where the pollution emergency is critical. The other two zones represent zones of influence of the pollution source, with lesser pollution levels.

In one or more embodiments, the alerts triggered by the relational database (104) and the results of the GIS (106) system may be displayed on the user interface (108). The user interface (108) may enable the stakeholder (109) of the pollutant exceedance monitoring and alerting system (100) to interact with the system. In one or more embodiments, the stakeholder (109) may receive alerts when the air pollutant parameters exceed the allowed limits, review reports generated by the GIS (106), configure the system, provide verifications, supply the system with externally generated data, take-over the control of the system if needed, etc. The user interface (108) may be a graphical user interface (GUI), a form-based user interface, a natural language user interface, a command line user interface, or any other suitable UI capable of taking input for the pollutant exceedance monitoring and alerting system (100).

In one or more embodiments, all the modules discussed above that are part of the pollutant exceedance monitoring and alerting system (100) may be connected with each other through wired connectivity or wireless connectivity. For example, the above-mentioned modules within the pollutant exceedance monitoring and alerting system (100) may be connected via PCB using circuit level or any other circuit configuration that communicates via a bus at motherboard level communications. Additionally or alternatively, the pollutant exceedance monitoring and alerting system (100) may be implemented in software and hardware and the communication between a plurality of modules can be distributed over a cloud network, using one or more wireless protocols. For example, communication between different pollutant exceedance monitoring and alerting system (100) parts may be performed using an IoT protocol over an IoT link, high speed connectivity such as Ethernet, Fiber Channel, etc.

Those skilled in the art will appreciate that while FIG. 1 shows all the modules communicating with the GIS (106) which then facilitates/transmits collected information to the user interface (108), FIG. 1 is not limited to the configuration shown. For example, one or more parts of the pollutant exceedance monitoring and alerting system (100) may be configured to directly communicate via hardware (PCB connections) or software as described above.

Figure 5:
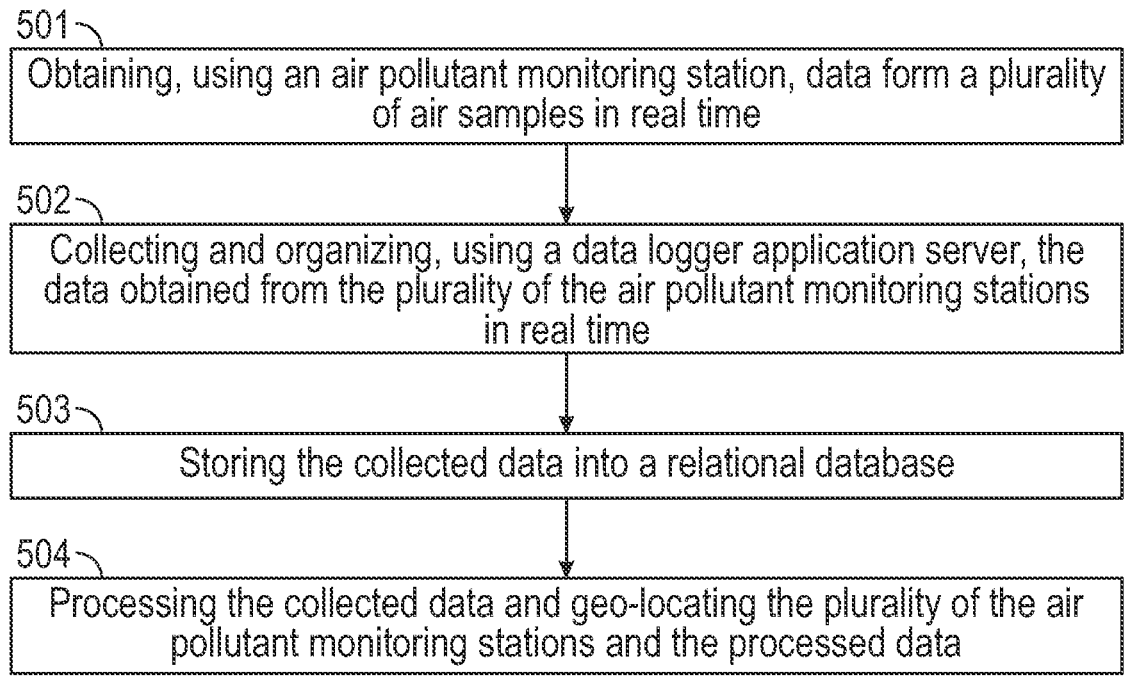
FIG. 5 shows an example of case where the pollution emergency occurred.

FIG. 5 shows a flowchart describing a method for tracking a concentration of pollution elements in air, in accordance with one or more embodiments of the invention. Further, one or more blocks in FIG. 5 may be performed by one or more components as described in FIG. 1 or FIG. 6 (e.g., computing system 600 including computer processor(s) 630 and communication interface 620). Specifically, FIG. 5 describes a method that may be performed by the monitoring stations (101), information logger (103), relational database (104), and GIS system (106). While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively. The method of FIG. 5 may be used, for example, to a tracking a concentration of pollution elements in air. Different modules of the method may be executed continuously or triggered by another module.

In Step 501, data is continuously or periodically obtained by the monitoring stations (101). The monitoring stations (101) operate by using the suction mechanisms to obtain air samples. The air samples may be tested using physical or chemical means. Data collected in Step 301 may include measurements on chemical compounds such as Nitrogen Oxide ($NO_2$), Ozone ($O_3$), Carbon Monoxide (CO), Sulfur Oxide ($SO_2$), Sulfur Dioxide ($SO_2$), methane ($CH_4$), and different hydrocarbons. By collecting such data, and differentiating between normal and abnormal levels of, at least, the above-mentioned compounds, ongoing or potential catastrophes may be detected. For example, high levels of methane may contribute to the creation of ground level ozone. Additionally, increased pollution in sensitive areas, such as wetlands and rivers, may endanger the water supplies and the species that live in those areas.

In Step 502, data obtained in Step 501 is collected by information logger (103). The information logger (103) may collect the obtained air pollution data in real time or periodically. The collected data is organized after each update received by the information logger. The obtained data from multiple monitoring stations (101) is being centralized with the information logger (103) as a single point of entry. Further, the information logger (103) provides aggregation, filtering, searching, and monitoring of the obtained data. The information logger (103) prepares the obtained data to be stored in the relational database (104).

When the data is collected and organized, the process moves to Step 503. In Step 503, the collected data is stored into a relational database (104). Additionally, triggers are determined for each parameter of the collected data. The triggers are used to notify the stakeholders (109) if the values of parameters exceed the given limit values. The trigger is a stored procedure in the relational database (104) which automatically invokes whenever a special event in the database occurs. For example, a trigger may be invoked when any of the air pollution parameters exceeds the given limit value. Additionally, the trigger may be invoked when multiple parameters reach different values in given ranges. The effect of the trigger may be raising a warning or an alert.

In Step 504, based on the knowledge obtained from the geospatial database (105), a geographical information system (GIS) (106) edits and maintains geospatial data. The data is connected to a map, integrating geolocation data with different types of information, such as, at least, cartographic data, photographic data, digital data, and data in spreadsheets. The GIS (106) helps users understand patterns, relationships, and geographic context. The output of GIS is supplied to the web application (107). The web application (107) provides a plurality of data manipulation and analysis options. Specifically, the change of the air pollution parameter trends may be monitored, and the air pollution problems may be identified in this step. Further, forecasting may be performed based on the data from the relational database (104) and the historical data from the geospatial database (105). For exemplary purposes, a GIS (106) generated map may include sites that produce pollution and areas sensitive to pollution, such as wetlands and rivers, helping to determine where water supplies are most at risk. Those skilled in the art will appreciate that the process of FIG. 5 may be repeated for each detected pollution emergency and may run in parallel for multiple ongoing or predicted emergencies.

Figure 6:
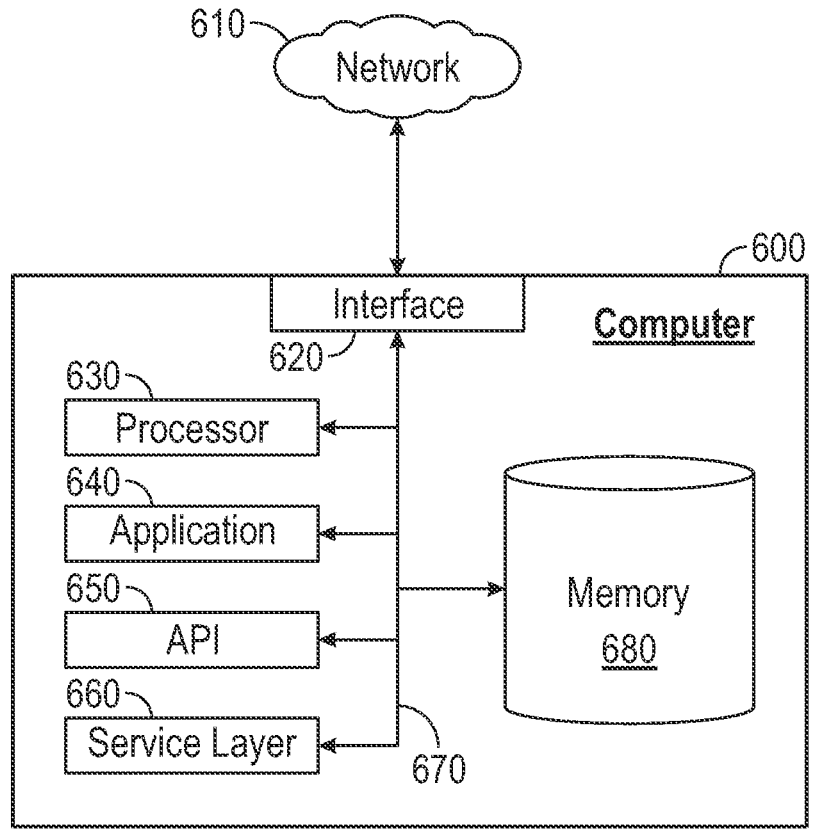
FIG. 6 shows a computer system in accordance with one or more embodiments.

Embodiments may be implemented on an any suitable computing device, such as the computer system shown in FIG. 6. Specifically, FIG. 6 is a block diagram of a computer system (600) used to provide computational functionalities associated with described algorithms, methods, functions, processes, flows, and procedures as described in the instant disclosure, according to an implementation. The illustrated computer (600) is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (600) may include a computer that includes an input device, such as a keypad, keyboard, touch screen, or other device that can accept user information, and an output device that conveys information associated with the operation of the computer (600), including digital data, visual, or audio information (or a combination of information), or a GUI.

The computer (600) can serve in a role as a client, network component, a server, a database or other persistency, or any other component (or a combination of roles) of a computer system for performing the subject matter described in the instant disclosure. The illustrated computer (600) is communicably coupled with a network (610). In some implementations, one or more components of the computer (600) may be configured to operate within environments, including cloud-computing-based, local, global, or other environment (or a combination of environments).

At a high level, the computer (600) is an electronic computing device operable to receive, transmit, process, store, or manage data and information associated with the described subject matter. According to some implementations, the computer (600) may also include or be communicably coupled with an application server, e-mail server, web server, caching server, streaming data server, business intelligence (BI) server, or other server (or a combination of servers).

The computer (600) can receive requests over network (610) from a client application (for example, executing on another computer (600) and responding to the received requests by processing the said requests in an appropriate software application. In addition, requests may also be sent to the computer (600) from internal users (for example, from a command console or by other appropriate access method), external or third-parties, other automated applications, as well as any other appropriate entities, individuals, systems, or computers.

Each of the components of the computer (600) can communicate using a system bus (670). In some implementations, any or all of the components of the computer (600), both hardware or software (or a combination of hardware and software), may interface with each other or the interface (620) (or a combination of both) over the system bus (670) using an application programming interface (API) (650) or a service layer (660) (or a combination of the API (650) and service layer (660). The API (650) may include specifications for routines, data structures, and object classes. The API (650) may be either computer-language independent or dependent and refer to a complete interface, a single function, or even a set of APIs. The service layer (660) provides software services to the computer (600) or other components (whether or not illustrated) that are communicably coupled to the computer (600). The functionality of the computer (600) may be accessible for all service consumers using this service layer. Software services, such as those provided by the service layer (660), provide reusable, defined business functionalities through a defined interface. For example, the interface may be software written in JAVA, C++, or other suitable language providing data in extensible markup language (XML) format or another suitable format. While illustrated as an integrated component of the computer (600), alternative implementations may illustrate the API (650) or the service layer (660) as stand-alone components in relation to other components of the computer (600) or other components (whether or not illustrated) that are communicably coupled to the computer (600). Moreover, any or all parts of the API (650) or the service layer (660) may be implemented as child or sub-modules of another software module, enterprise application, or hardware module without departing from the scope of this disclosure.

The computer (600) includes an interface (620). Although illustrated as a single interface (620) in FIG. 6, two or more interfaces (620) may be used according to particular needs, desires, or particular implementations of the computer (600). The interface (620) is used by the computer (600) for communicating with other systems in a distributed environment that are connected to the network (610). Generally, the interface (620 includes logic encoded in software or hardware (or a combination of software and hardware) and operable to communicate with the network (610). More specifically, the interface (620) may include software supporting one or more communication protocols associated with communications such that the network (610) or interface's hardware is operable to communicate physical signals within and outside of the illustrated computer (600).

The computer (600) includes at least one computer processor (630). Although illustrated as a single computer processor (630) in FIG. 6, two or more processors may be used according to particular needs, desires, or particular implementations of the computer (600). Generally, the computer processor (630) executes instructions and manipulates data to perform the operations of the computer (600) and any algorithms, methods, functions, processes, flows, and procedures as described in the instant disclosure.

The computer (600) also includes a memory (680) that holds data for the computer (600) or other components (or a combination of both) that can be connected to the network (610). For example, memory (680) can be a database storing data consistent with this disclosure. Although illustrated as a single memory (680) in FIG. 6, two or more memories may be used according to particular needs, desires, or particular implementations of the computer (600) and the described functionality. While memory (680) is illustrated as an integral component of the computer (600), in alternative implementations, memory (680) can be external to the computer (600).

The application (640) is an algorithmic software engine providing functionality according to particular needs, desires, or particular implementations of the computer (600), particularly with respect to functionality described in this disclosure. For example, application (640) can serve as one or more components, modules, applications, etc. Further, although illustrated as a single application (640), the application (640) may be implemented as multiple applications (640) on the computer (600). In addition, although illustrated as integral to the computer (600), in alternative implementations, the application (640) can be external to the computer (600).

There may be any number of computers (600) associated with, or external to, a computer system containing computer (600), each computer (600) communicating over network (610). Further, the term "client," "user," and other appropriate terminology may be used interchangeably as appropriate without departing from the scope of this disclosure. Moreover, this disclosure contemplates that many users may use one computer (600), or that one user may use multiple computers (600).

In some embodiments, the computer (600) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

While the disclosure has been described with respect to a limited number of embodiments, those skilled in the art, having benefit of this disclosure, will appreciate that other embodiments may be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for tracking a concentration of pollution elements in air, the system comprising:
    a plurality of air pollutant monitoring stations configured to obtain data from a plurality of air samples in real time or periodically;
    an information logger, in communication with the plurality of the air pollutant monitoring stations, configured to collect and organize the data obtained from the plurality of the air pollutant monitoring stations in the real time or periodically;
    a data storage, engaged with the information logger, configured to store the collected data into a relational database, create triggers for instances when air pollution parameters exceed a given limit value, and triggers an alert;
    a geographic information system (GIS) configured to tie the data to a map, by integrating geolocation data with a plurality of geospatial data types; and
    a web application configured to analyze the stored data, geo-locate the plurality of the air pollutant monitoring stations and the analyzed data, and generate reports based on the analysis of the stored data,
    wherein the GIS is configured to generate maps mapping upcoming hazards,
    wherein the generated maps are used to construct systems to prevent the upcoming hazards, and
    wherein the generated maps and a generated wind rose are used to generate an evacuation path and locate a gathering area during the upcoming hazards.

2. The system of claim 1, further comprising:
    a geospatial database comprised to store and query data that represents objects defined in a geometric space; and
    a user interface displaying the generated report and the triggered alerts.

3. The system of claim 1, wherein the plurality of the air pollutant monitoring stations uses suction devices to obtain the plurality of air samples.

4. The system of claim 1, wherein the plurality of the air pollutant monitoring stations examines the plurality of air samples using a plurality of physical and chemical tests.

5. The system of claim 1, wherein the plurality of air pollutant monitoring stations monitor compounds including Nitrogen Oxide ($NO_2$), Ozone ($O_3$), Carbon Monoxide (CO), Sulfur Oxide (SO), Sulfur Dioxide ($SO_2$), methane ($CH_4$), and a plurality of hydrocarbons.

6. The system of claim 2, wherein the objects defined in the geometric space are vector data and raster data.

7. The system of claim 1, wherein the geospatial data types are cartographic data, photographic data, digital data, and spreadsheet data.

8. The system of claim 1, wherein the GIS generates the map with buffer zones, the buffer zones indicating pollution areas.

9. The system of claim 2, wherein the given limit value is determined using the user interface or generated in the report.

10. A method for tracking a concentration of pollution elements in air, the method comprising:
    obtaining, using a plurality of air pollutant monitoring station, data from a plurality of air samples in real time or periodically;
    collecting and organizing, using an information logger, the data obtained from the plurality of the air pollutant monitoring stations in the real time or periodically;
    storing the collected data into a relational database, creating triggers for instances when air pollution parameters exceed a given limit value, and triggering an alert;
    tying the data to a map, by integrating geolocation data with a plurality of geospatial data types; and
    analyzing the stored data, geo-locating the plurality of the air pollutant monitoring stations and the analyzed data, and generating reports based on the analysis of the stored data,
    wherein maps mapping upcoming hazards are generated using a geographic information system (GIS),
    wherein constructing systems to prevent the upcoming hazards is based on the upcoming hazards, and
    wherein the generated maps and a generated wind rose are used to generate an evacuation path and locate a gathering area during the upcoming hazards.

11. The method of claim 10, further comprising:
    storing and querying the data that represents objects defined in a geometric space; and
    displaying the generated report and the triggered alerts.

12. The method of claim 10, wherein suction devices are used to obtain the plurality of air samples and wherein the plurality of air samples is examined using a plurality of physical and chemical tests.

13. The method of claim 10, wherein the plurality of air pollutant monitoring stations monitor compounds including Nitrogen Oxide ($NO_2$), Ozone ($O_3$), Carbon Monoxide (CO), Sulfur Oxide (SO), Sulfur Dioxide ($SO_2$), methane ($CH_4$), and a plurality of hydrocarbons.

14. The method of claim 11, wherein the objects defined in the geometric space are vector data and raster data.

15. The method of claim 10, wherein geospatial data types are cartographic data, photographic data, digital data, and spreadsheet data.

16. The method of claim 10, wherein forecasting is performed based on the data from the relational database and the data from a geospatial database.

17. The method of claim 10, wherein the maps with buffer zones are generated, the buffer zones indicating pollution areas.

18. The method of claim 10, wherein the given limit value is determined using a user interface or generated in the report.

* * * * *